(12) United States Patent
Murakami et al.

(10) Patent No.: US 8,040,544 B2
(45) Date of Patent: Oct. 18, 2011

(54) IMAGE OUTPUT SYSTEM HAVING IMAGE LOG RECORDING FUNCTION, AND LOG RECORDING METHOD IN IMAGE OUTPUT SYSTEM

(75) Inventors: Tetsunori Murakami, Yokohama (JP); Yoshihide Kohtani, Yokohama (JP); Ichiro Yamashita, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1141 days.

(21) Appl. No.: 11/269,993

(22) Filed: Nov. 9, 2005

(65) Prior Publication Data
US 2006/0290975 A1    Dec. 28, 2006

(30) Foreign Application Priority Data

Jun. 22, 2005    (JP) ................................ 2005-182493

(51) Int. Cl.
*G06F 3/12*    (2006.01)

(52) U.S. Cl. ....... 358/1.15; 358/1.1; 358/400; 358/1.13; 707/609; 707/661; 707/790; 707/802; 707/812; 714/49; 714/100; 714/723

(58) Field of Classification Search ................. 358/1.15, 358/400; 707/204, 200, 609, 661, 790, 802, 707/812; 714/49, 100, 723
See application file for complete search history.

(56) References Cited

U.S. PATENT DOCUMENTS

| | | | |
|---|---|---|---|
| 5,935,262 A * | 8/1999 | Barrett et al. ................. 714/46 |
| 5,978,477 A | 11/1999 | Hull et al. |
| 6,134,017 A * | 10/2000 | Schlank et al. .............. 358/1.15 |
| 6,199,073 B1 * | 3/2001 | Peairs et al. .................. 707/204 |
| 6,667,810 B1 * | 12/2003 | Jeyachandran et al. ...... 358/1.14 |
| 2003/0117665 A1 * | 6/2003 | Eguchi et al. ................. 358/402 |

FOREIGN PATENT DOCUMENTS
JP    10154228    6/1998
* cited by examiner

*Primary Examiner* — Benny Tieu
*Assistant Examiner* — Martin Mushambo
(74) *Attorney, Agent, or Firm* — Gesmer Updegrove LLP

(57) ABSTRACT

An image output system includes input section for inputting an image or data, instruction acceptance section for accepting an instruction of outputting the input image or an image generated from the input data, image output section for outputting the instructed image, and log-recording section for recording an image log, including at least the image to be output and the result information of an output process for the image to be output, irrespective of whether or not the output of the instructed image has been completed successfully.

15 Claims, 4 Drawing Sheets

| IMAGE DATA | UUID | OPERATION DATE AND TIME | OPERATOR | PROCESSING TYPE | TERMINA-TION STATE | DEVICE |
|---|---|---|---|---|---|---|
| 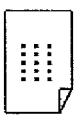 | 0019123-0001-2134-1234-000000000001 | 25 Apr 2005 12:30:30 JST | A | PRINT | NORMAL | 111.222.333.444 (INSTRUCT FROM 111.222.333.123) |
| 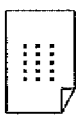 | 0019123-0001-2134-1234-000000000121 | 25 Apr 2005 12:33:20 JST | B | SCAN | NORMAL | 111.222.333.444 (SAVE IN 111.222.333.333) |
| 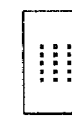 | 0019123-0001-2134-1234-000000001230 | 25 Apr 2005 12:36:32 JST | C | FAX TRANSMIS-SION | ERROR | 111.222.333.444 (TRANSMIT TO 045-440-1111) |
| 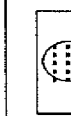 | 0019123-0001-2134-1234-000000004001 | 25 Apr 2005 12:40:10 JST | T | PRINT | NORMAL | 111.222.333.444 (INSTRUCT FROM 111.222.333.001) |
|  | 0019123-0001-2134-1234-000000004011 | 25 Apr 2005 13:00:30 JST | D | PRINT | NORMAL | 111.222.333.765 (INSTRUCT FROM 111.222.333.123) |
|  | 0019123-0001-2134-1234-000000050010 | 25 Apr 2005 13:03:37 JST | B | COPY | CANCEL | 111.222.333.444 |
| 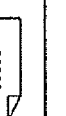 | 0019123-0001-2134-1234-000000050301 | 25 Apr 2005 13:50:00 JST | A | PRINT | NORMAL | 111.222.333.444 (INSTRUCT FROM 111.222.333.123) |
|  | 0019123-0001-2134-1234-000000600111 | 25 Apr 2005 14:04:05 JST | C | PRINT | NORMAL | 111.222.333.321 (INSTRUCT FROM 111.222.333.123) |

Fig. 4

IMAGE OUTPUT SYSTEM HAVING IMAGE LOG RECORDING FUNCTION, AND LOG RECORDING METHOD IN IMAGE OUTPUT SYSTEM

BACKGROUND OF THE INVENTION

1. Field of the Invention

The present invention relates to recording a log of an image formation process in an image-forming apparatus, and more particularly to recording the image read in the image formation process.

2. Description of the Related Art

In recent years, enhancing security of information handled within a company, compliance, and protection of personal information are getting more important. For instance, companies are required to disclose business information, like based on what information business has been accomplished, according to the auditing. For this purpose, it is needed to specify what information is processed by whom, as well as when, where, and how the information is processed, by managing access to information in a log.

To strengthen security management of confidential information that is conventionally handled on paper medium, there is a technology of allotting a UUID (Universally Unique Identifier) to the medium such as printing paper, and printing the UUID on the medium with a bar code or IC tag, or embedding it in the medium. If this UUID is used, management information concerning the medium may be retrieved to specify a confidential document, including an author who created the confidential document and time of creation.

Equal importance is placed on handling information in the form of images held and managed on paper medium and information stored on computer. Incidentally, there has been proposed a technology of transmitting an image read by an image-forming apparatus such as a copying machine or facsimile apparatus to a separately-provided document management system via a network, and performing document management. Combining the technology of retrievably recording the read image and the UUID would enable the UUID to serve as a key for specifying what document is formed by which copying machine, as well as when and by whom. Accordingly, even in the case where a confidential document has been created illegally or without permission, the author can be specified, by virtue of the ability to specify which copying machine has been used to copy the confidential document, when and by whom. Therefore, auditing may be completed correctly.

However, the above-mentioned technology retains only document images for which the image-forming apparatus has ended the image formation process normally, in order to improve convenience to the user; therefore, document images for which the image formation process ends abnormally and which are only partially formed are not retained for maintenance and management. That is, in the technology, when an image formation process is canceled during the course of copying a confidential document of tens of pages, such a process may provide important information, but the document is not recorded.

SUMMARY OF THE INVENTION

The present invention has been conceived to solve the above-mentioned problems, and an object thereof is to record a log concerning image formation processing whose execution has been started, without regard to the execution result of the processing.

In order to achieve the above-mentioned object, according to the present invention, there is provided an image output system includes input section for inputting an image or data, instruction acceptance section for accepting an instruction of outputting the input image or an image generated from the input data, image output section for outputting the instructed image, and log-recording section for recording an image log, including at least the image to be output and the result information of an output process for the image to be output, irrespective of whether or not the output of the instructed image has been completed successfully.

According to another aspect of the present invention, there is provided an image log information management device that holds and manages image log information generated by performing an image output process in an image output system, includes communication section that performs communication via a network, log information storage section that stores the image log information including at least the image and execution result information of an output process for the image, irrespective of whether or not the output process for the image in the image output system is successful, information registration section that registers the image log information transmitted via the network from the image output system, and information presentation section that picks up and returns the image log information matched with the acquisition from a user.

According to a further aspect of the present invention, there is provided an image log information system includes communication section that performs communication via a network, input section that inputs an image or data, instruction acceptance section that accepts an instruction of outputting the input image or an image generated from the input data, image output section that outputs the instructed image, log-recording section that records an image log, including at least the image to be output and the result information of an output process for the image to be output, irrespective of whether or not the output of the instructed image is ended normally, an acquisition acceptance section that accepts acquisition of an image log information, and information presentation section that picks up and returns the image log information matched with the acquisition from a user.

According to a further aspect of the present invention, there is provided a log-recording method for use with an image output system to be performed in a log-recording system including an image output system that outputs an input image or an image generated from input data according to an instruction, the method includes a log generation step of generating image log information including at least an image or the execution result of an output process for the image, when the image is input or the image is generated from the input data, and a log-recording step of recording the generated image log information in storage section, wherein the log is recorded for every image, irrespective of the execution result of the image output process.

According to a further aspect of the present invention, there is provided an image output device includes input section for inputting an image or data, instruction acceptance section for accepting an instruction of outputting the input image or an image generated from the input data, image output section for outputting the instructed image, and log-recording section for recording an image log, including at least the image to be output and the result information of an output process for the image to be output, irrespective of whether or not the output of the instructed image is completed normally.

According to a further aspect of the present invention, there is provided a storage medium readable by a computer, the storage medium storing a program of instructions executable by the computer to perform a function for recording a log, the function includes performing communication via a network, inputting an image or data, accepting an instruction of outputting the input image or an image generated from the input data, outputting the instructed image, recording an image log, including at least the image to be output and the result information of an output process for the image to be output, irrespective of whether or not the output of the instructed image is ended normally, accepting acquisition of an image log information, picking up the image log information matched with the acquisition request with the image designation information specified by a user, and presenting the picked up image log information to the user.

BRIEF DESCRIPTION OF THE DRAWINGS

Embodiments of the present invention will be described in detail by reference to the drawings, wherein;

FIG. 4 is a table showing a data organization example of the image log information according to the embodiment.

DETAILED DESCRIPTION OF THE INVENTION

Embodiments of the present invention will be described below in detail with reference to the drawings.

Figure 1:
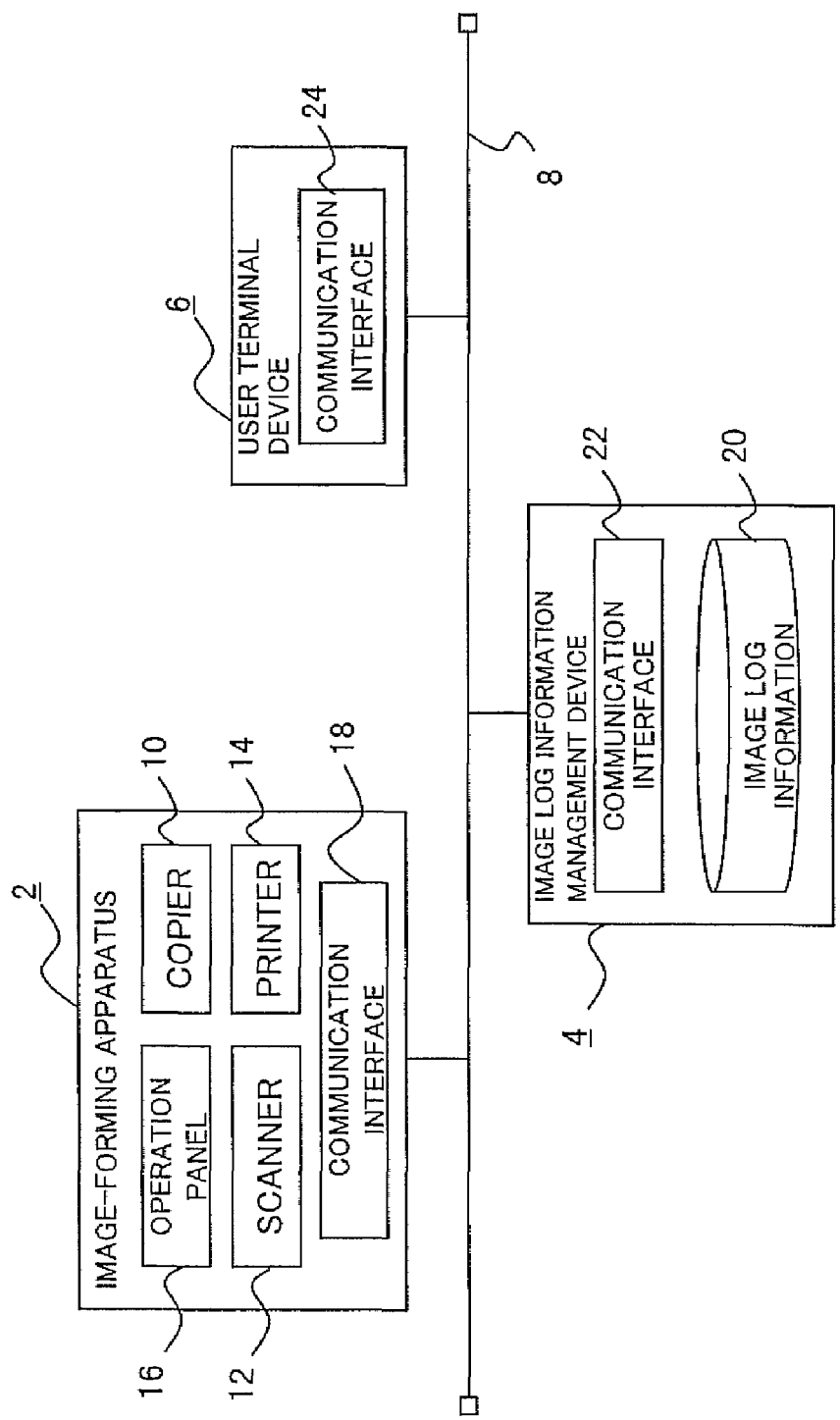
FIG. 1 is an overall configuration diagram showing an image log information system according to an embodiment of the present invention.

FIG. 1 is an overall configuration diagram showing an image log information system according to an embodiment of the invention. In FIG. 1, an image-forming apparatus 2, an image log information management device 4, and a user terminal device 6 are connected via a LAN (Local Area Network) 8. The image-forming apparatus 2 of this embodiment forms an image subject to log management, and is a multi-function machine having a copier 10, a scanner 12, and a printer 14. The user selects and employs each processing function from an operation panel 16. Further, the image-forming apparatus 2 has a communication interface 18 for enabling exchange of information with another network device via the LAN 8. The image log information management device 4 holds and manages the image log information generated by the image-forming apparatus 2, and is implemented by a database server. The image log information management device 4 has an external storage device 20 that stores the image log information, and a communication interface 22 that enables exchange of information with another network device. The user terminal device 6 is the information terminal section employed by the user to refer to the image log information stored in the image log information management device 4, and is a personal computer (PC) The user terminal device 6 has a communication interface 24 for enabling exchange of information with another network device.

For the sake of convenience, only one image-forming apparatus 2 and one user terminal device 6 are shown in FIG. 1, but a plurality of image-forming apparatuses 2 or a plurality of user terminal devices 6 may be connected to the LAN 8. In such a case, the plurality of apparatuses 2 or devices 68 may be identical in configuration.

Figure 2:
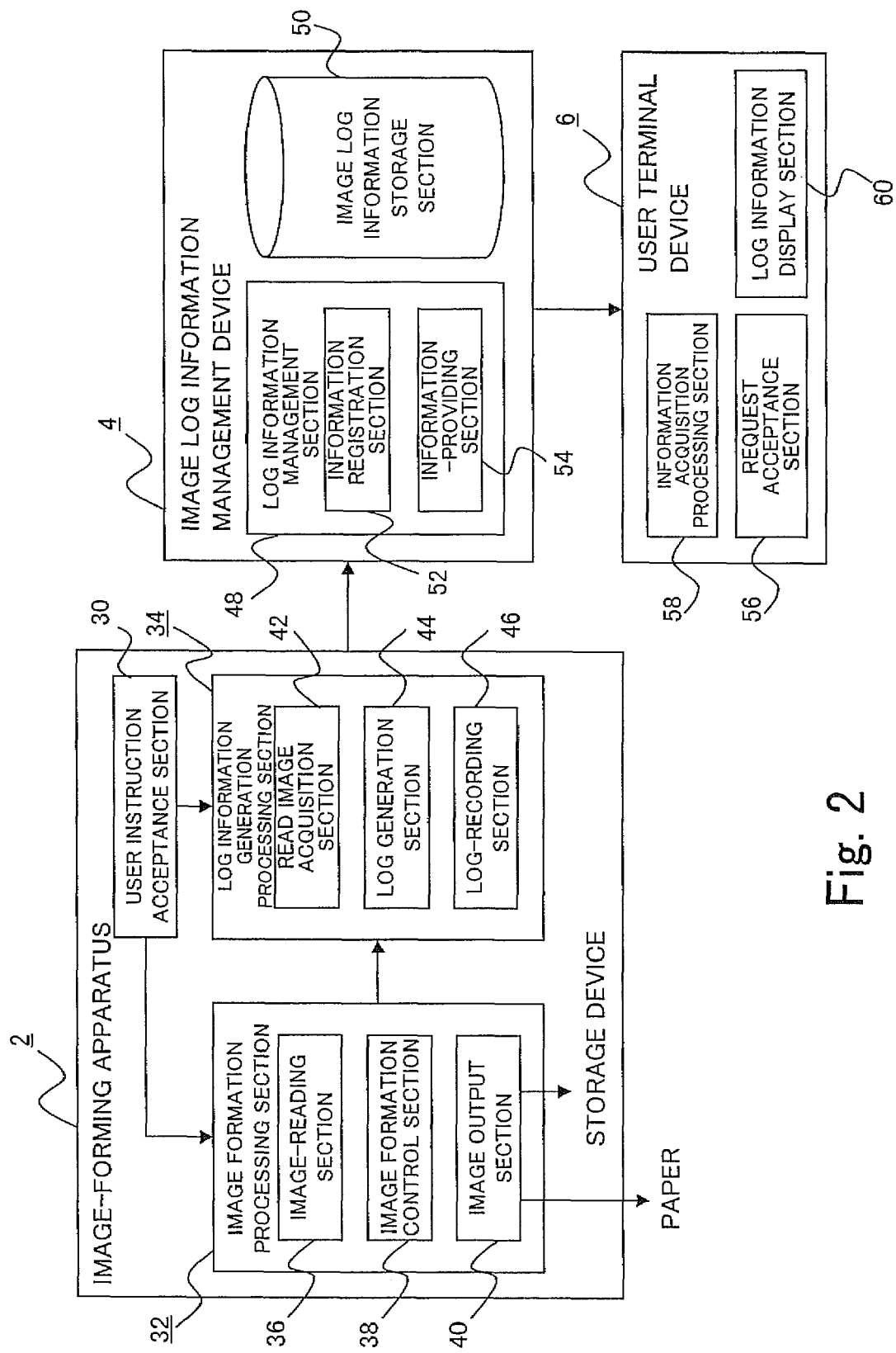
FIG. 2 is a block diagram of the image log information system according to the embodiment.

FIG. 2 is a block diagram of an image log information system according to the embodiment. In FIG. 2, the image-forming apparatus 2, the image log information management device 4, and the user terminal device 6 of FIG. 1 are shown.

The image-forming apparatus 2 has a user instruction acceptance section 30, an image formation processing section 32, and a log information generation processing section 34. The user instruction acceptance section 30 accepts a user operation on the operation panel. The image formation processing section 32 performs an image formation process intrinsic to the image-forming apparatus, and has an image-reading section 36, an image formation control section 38, and an image output section 40. The image-reading section 36 reads an image by scanning the sheet carrying the image when the user selects a copy function or a scan function. Alternatively, the image-reading section reads an image received via the network. In any case, the image-reading section 36 acquires the image subjected to log management according to a user operation. The image formation control section 38 controls the overall operation of the image-forming apparatus by driving a scanner mechanism, a copy mechanism, or the like according to an instruction from the user. The image output section 40 outputs the image to a destination according to the user instruction, when the image formation process is ended normally. The image output destination is the print sheet in the case of the copying or printing function, and an external storage device or the like contained in the apparatus in the case of the scanning function.

The log information generation processing section 34, which is a featured component in the present embodiment, records the log of image acquired through the image formation process in the image formation control section 38, and includes a read image acquisition section 42, a log generation section 44, and a log-recording section 46. The read image acquisition section 42 acquires the image from the image-reading section 36 in the image formation processing section 32. The image read by the image-reading section 36 is acquired, irrespective of whether the termination state of the image formation process is normal or abnormal, or whether the operation has ended abnormally when one page of document is being read. The log generation section 44 generates the log information regarding the image, when the read image acquisition section 42 acquires the image. The log-recording section 46 sends the image log information generated by the log generation section 44 to the image log information management device 4 for recording.

Each of the processing functions of the user instruction acceptance section 30, the image formation processing section 32, and the log information generation processing section 34 is implemented by cooperative operation of a computer mounted on the image-forming apparatus 2 and a software program executed by the computer.

The image log information management device 4 has a log information management section 48 and an image log information storage section 50 for integrally managing the image log information sent from one or more image-forming apparatuses 2. The image log information storage section 50 is a storage device that stores the image log information, and the log information management section 48 manages the image log information stored in the image log information storage section 50. An information registration section 52 included in the log information management section 48 registers the image log information sent from the image-forming apparatus 2 in the image log information storage section 50. Also, in response to an acquisition request for image log information sent from the user terminal device 6, an information-providing section 54 picks up the image log information corresponding to the acquisition request for image log information from the image log information storage section 50 and returns the information to the user terminal device 6. A processing function of the log information management section 48 is implemented by cooperative operation of a computer mounted on a server computer that implements the log information management device 4, and a software program executed by the computer.

The user terminal device 6 has a request acceptance section 56, an information processing acquisition section 58 and a log information display section 60. The request acceptance section 56 accepts the retrieval conditions for log information specified by input from the user. The information processing acquisition section 58 sends a log information acquisition request including the accepted retrieval conditions to the image log information management device 4, and receives the image log information returned in response to the request. The log information display section 60 displays the received image log information on a display. The processing functions of the request acceptance section 56, the information processing acquisition section 58, and the log information display section 60 are implemented by cooperative operation of a PC that implements the user terminal device 6, and a software program executed by the PC.

Figure 3:
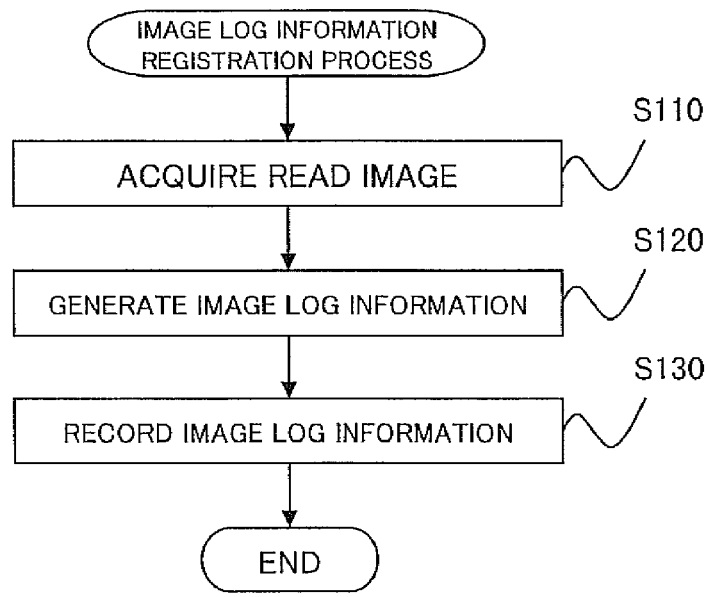
FIG. 3 is a flowchart showing an image log information registration process according to the embodiment.

Next, the operation of the present embodiment will be described below. This embodiment is divided into a registration process of image log information, and a display process of registered image log information. Firstly, the registration process of image log information will be described with reference to a flowchart of FIG. 3. Herein, a user operation by which the user copies the original is taken as an example.

When a user sets a plurality of sheets of document on a document feeder of the image-forming apparatus 2, and inputs a copy instruction from the operation panel, the image formation control section 38 starts an image formation process, or a copy process in this case, in accordance with the user instruction. The image-reading section 36 reads and forms the image every time the sheet is fed onto a platen glass. The image-forming apparatus 2 usually outputs the read image to the image output section 40. In this example, the read image is sequentially transferred and printed onto the sheets.

The log information generation processing section 34 acquires the image read by the image reading section 36 from the image formation processing section 32 in parallel with the above image formation process (step 110), and generates the image log information including its image (step 120). Next, the log-recording section 46 sends the generated image log information to the image log information management device 4, which then records the image log information (step 130). That is, the log information management section 48 of the image log information management device 4 registers the image log information in the image log information storage section 50, when the image log information is sent from the image-forming apparatus 2.

By reference to FIG. 4, the data organization of image log information generated by the log generation section 44 will be described below. As shown in FIG. 4, the image log information is composed of image data, a UUID, date and time of operation, operator, processing type, termination state, and device information. In the present embodiment the image data are image data read by the image-reading section 36, but a thumbnail image may be used when the data amount is enormous. The UUID is assigned to the read document, and extracted from the read image. The date and time of operation is the time information for specifying the date and time when the image is read, and is acquired from a clock provided in the image-forming apparatus 2. The operator is information identifying the person who performs the copy operation, and is in the form of a user ID or user name. In this embodiment, when the image-forming apparatus 2 is employed, the operation is presumed to be accepted after log-in, whereby the user identification information can be obtained from the user information specified at the log-in time. Of course, this embodiment may be applied to a image-forming apparatus 2 not requiring the log-in, in which the user information may be input at the time of copying, or the information concerning the operator may not be acquired, although the person who reads the image is unknown. The processing type is the information that specifies the processing performed when the read image is generated. The image-forming apparatus 2 of this embodiment has the processing types of "print" when the print function is used, "scan" when the scan function is used, "FAX transmission" when the FAX function is used, and "copy" when the copy function is used as in the present example. The termination state is the state where reading of the image is terminated in using each function. The state types are "normal", "error" and "cancel". "Normal" occurs when the image reading is ended normally; "error" occurs when the image reading is ended abnormally, for example, due to a paper jam; and "cancel" occurs when the user suspends the reading operation while reading the image by pressing a cancel button. The processing type and the termination state may be obtained together with the read image from the image formation processing section 32. "Device" is information that specifies the device from which the image log information is generated, and in the present embodiment an IP address is employed. In the case where the print data are transmitted via the network to the image-forming apparatus 2 to perform the printing process, such as the print function, the IP address of print data transmission source is also recorded. In the FAX transmission function, the IP address of transmission destination is also recorded. The log information generation processing section 34 acquires the IP address of the image-forming apparatus 2 from the internally held information, and acquires the IP address of a printing process requesting terminal together with the read image from the image formation processing section 32.

As will be apparent from the data organization of image log information, in the present embodiment, the start of the image reading and its execution are recorded as the log regardless of the termination state of reading the image. For example, if the cancel button is pressed when seven pages of a confidential document of ten pages have been copied, or a paper jam occurs while one sheet of paper is being read, the log information is recorded for the reading process for every sheet, irrespective of whether or not the operation has ended normally. Conventionally, the log information is out of the scope of management in the document management system because the operation is not ended normally. More specifically, if copying the confidential document of ten pages ends with only seven pages being copied (the image-reading process is performed seven times), seven records of image log information with seven pages of read image are generated and recorded, or even when a paper jam occurs while reading one sheet of document and the copying is not ended normally, one record of image log information with read image up to the normally read portion (e.g., half of the original) is generated and recorded, whereby the important information for auditing is subject to log management.

Figure 5:
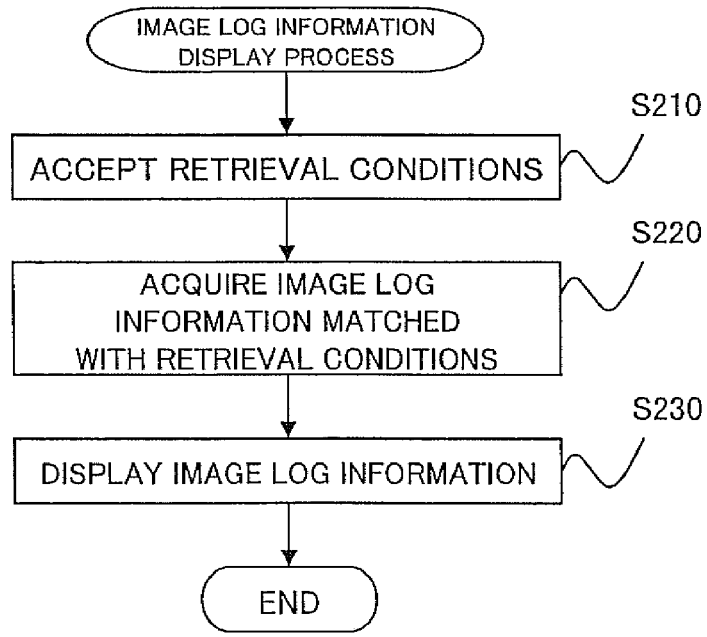
FIG. 5 is a flowchart showing an image log information display process according to the embodiment.

By reference to a flowchart of FIG. 5, a display process of image log information will be described below. In the case where the user inputs and specifies data of one or more items constituting the image log information, such as UUID, termination state, etc., from the user terminal device 6, the request acceptance section 56 accepts the specified data as the retrieval conditions (step 210), whereby the information processing acquisition section 58 sends to the image log information management device 4 a log information acquisition request including the accepted retrieval conditions.

In the image log information management device 4, the information-providing section 54 of the log information management section 48 receives the image log information acquisition request sent from the user terminal device 6, retrieves the image log information from the image log information storage section 50 with the retrieval conditions included in the acquisition request as a key, and acquires the corresponding image log information (step 220). Subsequently, the acquired image log information is returned to the user terminal device 6 serving as the source of request transmission.

Receiving the image log information returned in response to the acquisition request, the log information display section 60 of the user terminal device 6 displays this information on the screen (step 230).

In the present embodiment, one example of image log information is shown in FIG. 4, but the data organization of image log information is not limited thereto. For example, for the convenience of retrieval, a retrieval word may be extracted and added in the case of a document image. Also, index information may be formed. In addition, detailed setting information specified by the user such as paper size and scaling factor may also be recorded.

Also, in the present embodiment, for the convenience of auditing, the log information is collected for all the read images. However, when the amount of image log information is enormous, there may be provided an additional function of setting the device that collects logs, or time of collecting logs, in accordance with purposes.

Also, in the present embodiment, the image log information system in the local area network system is described, in which the image log information of the overall system is integrally managed by providing the image log information management device 4, but the image log information may be managed separately in accordance with purposes. For example, the image log information storage section 50 may be provided separately for every processing type, or the functions of the image log information management device 4 may be provided on the image-forming apparatus 2, in which the functions are managed on the basis of the image-forming apparatus. The system may be configured in accordance with scale and operation.

Though the embodiment has been described as employing the user terminal device 6 in the form of a PC as the device for referring to the image log information, the image-forming apparatus 2 may be employed. For example, when the UUID is input in characters, the key input can be performed from the PC, but when the UUID is automatically input using a scan function (OCR function), or the image log information storage section 50 is retrieved by image data, the image-forming apparatus 2 may be employed for referring to the image log information.

According to an aspect of the present invention, there is provided an image output system includes input section for inputting an image or data, instruction acceptance section for accepting an instruction of outputting the input image or an image generated from the input data, image output section for outputting the instructed image, and log-recording section for recording an image log, including at least the image to be output and the result information of an output process for the image to be output, irrespective of whether or not the output of the instructed image has been completed successfully.

According to another aspect of the present invention, the storage section may have communication section that performs information exchange via a network, and the log-recording section records the image log information in the storage section connected to the network.

According to a further aspect of the present invention, the recorded image log further may include at least one of identification information of the user who instructs the output, identification information of the image to be output, user operation date and time information, image output processing type, and device identification information.

According to a further aspect of the present invention, the image log may be generated for every image to be output.

According to a further aspect of the present invention, there is provided an image log information management device that holds and manages image log information generated by performing an image output process in an image output system, includes communication section that performs communication via a network, log information storage section that stores the image log information including at least the image and execution result information of an output process for the image, irrespective of whether or not the output process for the image in the image output system is successful, information registration section that registers the image log information transmitted via the network from the image output system, and information presentation section that picks up and returns the image log information matched with the acquisition from a user.

According to a further aspect of the present invention, there is provided an image log information system includes communication section that performs communication via a network, input section that inputs an image or data, instruction acceptance section that accepts an instruction of outputting the input image or an image generated from the input data, image output section that outputs the instructed image, log-recording section that records an image log, including at least the image to be output and the result information of an output process for the image to be output, irrespective of whether or not the output of the instructed image is ended normally, an acquisition acceptance section that accepts acquisition of an image log information, and information presentation section that picks up and returns the image log information matched with the acquisition from a user.

According to a further aspect of the present invention, there is provided a log-recording method for use with an image output system to be performed in a log-recording system including an image output system that outputs an input image or an image generated from input data according to an instruction, the method includes a log generation step of generating image log information including at least an image or the execution result of an output process for the image, when the image is input or the image is generated from the input data, and a log-recording step of recording the generated image log information in storage section, wherein the log is recorded for every image, irrespective of the execution result of the image output process.

According to a further aspect of the present invention, there is provided an image output device includes input section for inputting an image or data, instruction acceptance section for accepting an instruction of outputting the input image or an image generated from the input data, image output section for outputting the instructed image, and log-recording section for recording an image log, including at least the image to be output and the result information of an output process for the image to be output, irrespective of whether or not the output of the instructed image is completed normally.

According to a further aspect of the present invention, there is provided a storage medium readable by a computer, the storage medium storing a program of instructions executable by the computer to perform a function for recording a log, the function includes performing communication via a network, inputting an image or data, accepting an instruction of outputting the input image or an image generated from the input data, outputting the instructed image, recording an image log, including at least the image to be output and the result information of an output process for the image to be output, irrespective of whether or not the output of the instructed image is ended normally, accepting acquisition of an image log information, picking up the image log information matched with the acquisition request with the image designation information specified by a user, and presenting the picked up image log information to the user.

The complete disclosure of Japanese Patent Application No. 2005-182493 filed on Jun. 22, 2005, including the specification, claims, drawings, and abstract, is incorporated herein by reference in its entirety.

What is claimed is:

1. An image output system comprising:
    input device for receiving image data;
    instruction acceptance section for accepting an instruction corresponding to outputting the received image data;
    image output section for outputting the received image data in accordance with the accepted instruction; and
    log-recording section for generating and recording an image log;
    said log-recording section generating termination state information based upon a termination state of the outputting of the received image data by said image output section, the termination state information indicating a normal termination when the received image data is outputted successfully by said image output section, the termination state information indicating an error-caused termination when the received image data is outputted unsuccessfully due to an unsuccessful operation of said image output section, the termination state information indicating a cancelled termination when a user cancels the outputting of the received image data by said image output section;
    said log-recording section generating the image log such that the image log includes the image that has been input and the termination state information for the image that has been input;
    said log-recording section generating the image log such that when the output of the instructed image has been completed unsuccessfully, the image included in the image log being only part of the image data that has been outputted by said image output section before the error-caused termination;
    said log-recording section generating the image log such that when the output of the instructed image has been cancelled, the image included in the image log being only part of the image data that has been outputted by said image output section before the cancelled termination.

2. The image output system according to claim 1, wherein the log-recording section has a communication section that performs information exchange via a network, and the log-recording section records the image log information in the storage section connected to the network.

3. The image output system according to claim 1, wherein the recorded image log further includes at least one of identification information of the user who instructs the output, identification information of the image to be output, user operation date and time information, image output processing type, and device identification information.

4. The image output system according to claim 1, wherein the image log is generated for every image to be output.

5. The image output system according to claim 1, wherein the log-recording section records an image log when the output of the instructed image has been completed successfully.

6. An image log information management device that holds and manages image log information generated by performing, upon image data, an image output process in an image output system, comprising:
    communication section that performs communication via a network;
    log information storage section that stores the image log information, the image log information including image data that has been input and termination state information of an output process for the image data that has been input, the termination state information indicating a normal termination when the image data that has been input is outputted successfully, the termination state information indicating an error-caused termination when the image data that has been input is outputted unsuccessfully due to an unsuccessful operation, the termination state information indicating a cancelled termination when a user cancels the outputting of the image data that has been input, the image included in the image log being only part of the image data that has been outputted before the error-caused termination when the output of the image data that has been input has been completed unsuccessfully, the image included in the image log being only part of the image data that has been outputted before the cancelled termination when the output of the image data that has been input has been cancelled;
    information registration section that registers the image log information transmitted via the network from the image output system; and
    information presentation section that picks up and returns the image log information matched with the acquisition from a user.

7. The image log information management device according to claim 6, wherein the log information storage section stores the image log information when the output process for the image in the image output system is successful.

8. An image log information system comprising:
    communication device that performs communication via a network;
    input device that receives image data;
    instruction acceptance section that accepts an instruction corresponding to outputting the received image data;
    image output section that outputs the received image data in accordance with the accepted instruction;
    log-recording section for generating and recording an image log;
    said log-recording section generating termination state information based upon a termination state of the outputting of the received image data by said image output section, the termination state information indicating a normal termination when the received image data is outputted successfully by said image output section, the termination state information indicating an error-caused termination when the received image data is outputted unsuccessfully due to an unsuccessful operation of said image output section, the termination state information indicating a cancelled termination when a user cancels the outputting of the received image data by said image output section;

said log-recording section generating the image log such that the image log includes the image that has been input and the termination state information for the image that has been input;

said log-recording section generating the image log such that when the output of the instructed image has been completed unsuccessfully, the image included in the image log being only part of the image data that has been outputted by said image output section before the error-caused termination;

said log-recording section generating the image log such that when the output of the instructed image has been cancelled, the image included in the image log being only part of the image data that has been outputted by said image output section before the cancelled termination;

an acquisition acceptance section that accepts acquisition of image log information; and information presentation section that picks up and returns the image log information matched with the acquisition from a user.

9. The image log information system according to claim 8, wherein the log-recording section records the image log information when the output process for the image in the image output system is successful.

10. A log-recording method for use with an image output system to be performed in a log-recording system comprising an image output system that outputs an input image or an image generated from input data according to an instruction, the method comprising:

generating termination state information based upon a termination state of the outputting of the input image, the termination state information indicating a normal termination when the input image is outputted successfully, the termination state information indicating an error-caused termination when the input image is outputted unsuccessfully due to an unsuccessful operation, the termination state information indicating a cancelled termination when a user cancels the outputting of the input image;

generating image log information, the image log information including an image that has been input and the termination state information of an output process for the image that has been input, the image included in the image log being only part of the image that has been outputted before the error-caused termination when the output of the image has been completed unsuccessfully, the image included in the image log being only part of the image that has been outputted before the cancelled termination when the output of the image has been cancelled; and recording the generated image log information in storage section.

11. The log-recording method according to claim 10, wherein the log is recorded for every image when the execution result of the image output process is successful.

12. An image output device comprising:
input device for receiving image data;
instruction acceptance section for accepting an instruction corresponding to outputting the received image data;
image output section for outputting the received image data in accordance with the accepted instruction; and
log-recording section for generating and recording an image log;
said log-recording section generating termination state information based upon a termination state of the inputting of the received image data by said input section, the termination state information indicating a normal termination when the received image data is inputted successfully by said input section, the termination state information indicating an error-caused termination when the received image data is inputted unsuccessfully due to an unsuccessful operation of said input section, the termination state information indicating a cancelled termination when a user cancels the inputting of the received image data by said input section;

said log-recording section generating the image log such that the image log includes the image that has been input and the termination state information for the image that has been input;

said log-recording section generating the image log such that when the input of the instructed image has been completed unsuccessfully, the image included in the image log being only part of the image data that has been inputted by said input section before the error-caused termination;

said log-recording section generating the image log such that when the input of the instructed image has been cancelled, the image included in the image log being only part of the image data that has been inputted by said input section before the cancelled termination.

13. The image output device according to claim 12, wherein the log-recording section records an image log when the output of the instructed image is completed successfully.

14. A non-transitory storage medium readable by a computer, the storage medium storing a program of instructions executable by the computer to perform a function for recording a log, the function comprising:

performing communication via a network;
receiving image data;
accepting an instruction corresponding to outputting the received image data;
outputting the received image data in accordance with the accepted instruction;
generating termination state information based upon a termination state of the inputting of the input image, the termination state information indicating a normal termination when the input image is inputted successfully, the termination state information indicating an error-caused termination when the input image is inputted unsuccessfully due to an unsuccessful operation, the termination state information indicating a cancelled termination when a user cancels the inputting of the input image;
generating image log information, the image log information including an image that has been input and the termination state information of an input process for the image, the image included in the image log being only part of the image that has been inputted before the error-caused termination when the input of the image has been completed unsuccessfully, the image included in the image log being only part of the image that has been inputted before the cancelled termination when the input of the image has been cancelled;
recording the generated image log information;
accepting acquisition of image log information;
picking up the image log information matched with the acquisition request with the image designation information specified by a user; and
presenting the picked up image log information to the user.

15. A non-transitory storage medium readable according to claim 14, wherein the log is recorded for every image when the output of the instructed image is completed successfully.

* * * * *